Patented Apr. 14, 1942

2,280,040

UNITED STATES PATENT OFFICE 2,280,040

PREPARATION OF NICOTINIC ACID AMIDE

Howard F. Seibert and Lester J. Szabo, Cleveland, Juro Wyeno, Chagrin Falls, and Elmer R. Eckhardt, Cleveland, Ohio, assignors, by mesne assignments, to S. M. A. Corporation, Chicago, Ill., a corporation of New Jersey No Drawing. Application October 13, 1939, Serial No. 299,384

2 Claims. (Cl. 260—295)

Nicotinic acid and nicotinic acid amide and several related compounds are recognized as specifics for certain acute symptoms of pellagra. These substances occur in a variety of natural substances but even in the most potent sources such as yeast they are not present in a high enough concentration to be useful, especially in the treatment of severe cases. For this purpose nicotinic acid or nicotinic acid amide and related compounds in pure form are indicated.

While nicotinic acid is effective in combatting the disease in its severe form, as well as milder degrees of deficiency, its use is followed in a very large proportion of cases with unpleasant side reactions, such as flushing of the face, neck, and sometimes other parts of the body; also, with itching and other unpleasant symptoms. When nicotinic acid is given parenterally, it is almost impossible to give it slowly enough to avoid side reactions in almost every case. Such unpleasant side reactions interfere markedly with the cooperation the physician can obtain from his patient, particularly where it is prescribed for sub-clinical pellagra. Nicotinic acid amide, however, because it is probably the form in which the vitamin is ultimately used in the body, does not give these unpleasant side reactions. Nicotinic acid amide, therefore, is much more useful to the clinician than nicotinic acid because the physician does not have to be concerned about the lack of cooperation on the part of his patient because of unpleasant side effects.

We have discovered a method by which nicotinic acid amide may be produced in a pure and potent form and which when used clinically is free from side reactions.

Our method involves broadly, esterification to form nicotinic acid ester followed by conversion to nicotinic acid amide. As illustrative of the method which may be used, the following is given.

50 pounds of nicotinic acid, 3-pyridine-carboxylic acid, is added to 107 pounds of completely denatured absolute alcohol and 107 pounds of concentrated sulfuric acid are added slowly to the mixture, the heat evolved boiling the alcohol. During the addition of the sulfuric acid the mixture is stirred and cooling maintained throughout in order to prevent distillation of the alcohol due to the heat of reaction generated by the sulfuric acid addition. This solution is then refluxed in a suitable apparatus for five hours. It is then treated with an alkali. Soda ash has been found preferable in that better yields are obtained. 170 pounds of 58% soda ash is used in a total volume of 50 to 60 gallons of water, the volume being regulated so that the solution becomes just alkaline. During the neutralization the nicotinic acid ester sulfate is decomposed and free nicotinic acid ester is obtained.

The above solution is extracted with a suitable solvent which is immiscible with water and in which the ester is soluble. Benzene is suitable and from 15 to 20 gallons thereof are satisfactory. The benzene extracts are washed with water and evaporated in a closed still to remove most of the benzene. The residue is of brownish color and is crude nicotinic ester in a yield of over 80%.

To obtain the amide the crude ethyl nicotinate as obtained above is treated with five times its weight of concentrated ammonium hydroxide and allowed to stand for some time preferably for a period of twenty-four hours with occasional stirring to form a suspension. When the reaction is complete the ester is converted to nicotinic amide together with small amounts of ammonium nicotinate. The solution is evaporated in vacuum to a volume of about five gallons. The evaporation must be carefully done because concentration of the solution if carried too far causes the ammonium nicotinate to hydrolize accompanied by the decomposition of nicotinic acid amide.

For a commercial product containing 10% or less free nicotinic acid (to be standardized) it is sufficient to wash the moist nicotinic acid amide with a water soluble solvent, such as acetone. The washing is continued until free of all color and a product is secured satisfactory for therapeutic administration in much larger doses without the objectionable side effects accompanying the administration of the free acid.

While an amide containing 5% of nicotinic acid will act therapeutically, for production of pure nicotinic acid amide the nicotinic acid should be removed. The concentrated solution is allowed to cool and the solid residue dissolved in water at room temperature and any free nicotinic acid present is carefully neutralized with a mild base such as sodium carbonate. The neutralization forms sodium nicotinate which is stable. The resulting solution is treated with decolorizing carbon, filtered and again concentrated in vacuum. Both of these concentration steps must be done very carefully to a critical volume since the amide is very soluble in water.

The solid remaining is carefully dried. It is not the pure amide and in order to obtain the pure product after drying the solid residue is taken up in boiling absolute alcohol and the amide is precipitated with benzene or some other solvent in which the amide is only slightly soluble such as ethyl acetate, ether or petroleum ether. The precipitate is the pure nicotinic acid amide and occurs in fluffy needle like crystals which are white. This product may be further purified by a suitable solvent or recrystallization.

Because of the difficulty of freeing nicotinic acid amide from nicotinic acid by simple crystallization it often becomes necessary to use special means of purification. We have found that this may be accomplished by the use of metals whose acetates are soluble in alcohol and whose nicotinates are insoluble in alcohol and water. Specific examples involving the use of copper acetate and zinc acetate are given, it being understood that all metal acetates having the above characteristics are suitable.

The nicotinic acid content of the unpurified nicotinic acid amide may vary considerably and in the following examples the amide treated is considered as containing 2% free nicotinic acid.

Purification using copper acetate 20 pounds of nicotinic acid amide as prepared above is dissolved in approximately 40 pounds of warm absolute ethyl alcohol. To this solution is added 0.330 pound (theoretical 0.325 pound) of copper acetate monohydrate which has been dissolved in approximately 40 pounds absolute alcohol. Copper nicotinate is precipitated and the compound solution allowed to cool whereupon the copper nicotinate is filtered off.

Purification using zinc acetate 20 pounds of nicotinic acid amide containing 2% nicotinic acid is dissolved in approximately 40 pounds of warm absolute ethyl alcohol and to this solution is added 0.360 pound (theoretical 0.354 pound) of zinc acetate dihydrate which has been previously dissolved in approximately 40 pounds absolute alcohol. The compound solution precipitates zinc nicotinate, is allowed to cool, and the precipitate filtered off.

The resultant clear filtrate of both processes may now be concentrated to crystallization or ether added thereto to precipitate the nicotinic acide amide. In either event the amide is filtered off, washed with ether to remove any metal acetate and the amide then recrystallized from water, benzene, acetone or other suitable solvent.

Crystallization occurs as white fluffy needles from benzene, as granules from acetone or as prisms from water. These crystals are odorless with a slightly bitter taste. When absolutely pure the melting point is 133°. The amide is extremely easily soluble in water and alcohol, soluble in all aqueous solvents, slightly soluble in boiling benzene, sparingly soluble in cold benzene, hot or cold petroleum ether and in ethyl ether.

In its crystalline form it may be prepared in tablets of proper dosage content for administration in indicated deficiency treatment.

We claim:

1. The process of preparing nicotinic acid amide which consists in treating nicotinic acid with alcohol and sulfuric acid, refluxing the reaction product, neutralizing to decompose the reaction product and to obtain nicotinic acid ester, extracting said ester, treating said extracted ester with ammonium hydroxide to form nicotinic acid amide and ammonium nicotinate, removing said nicotinate, dissolving said amide in alcohol and treating the amide to form an insoluble nicotinate by the use of a metal whose acetates are soluble in alcohol and whose nicotinates are insoluble in alcohol and water.

2. The process of preparing nicotinic acid amide, which consists in treating nicotinic acid with alcohol and sulfuric acid, refluxing the reaction mixture, neutralizing to decompose the ester sulfate and to obtain free nicotinic acid ester, extracting said ester, treating said extracted ester with ammonium hydroxide to form nicotinic acid amide and ammonium nicotinate, evaporating to dryness under reduced pressure, dissolving the residue in alcohol, adding a metal acetate which is soluble in alcohol and whose nicotinate is insoluble in alcohol, removing the separated metal nicotinate and evaporating to effect crystallization.

HOWARD F. SEIBERT.
LESTER J. SZABO.
JURO WYENO.
ELMER R. ECKHARDT.